United States Patent [19]
Beutel et al.

[11] Patent Number: 5,367,172
[45] Date of Patent: Nov. 22, 1994

[54] RADIOLOGICAL SYSTEM EMPLOYING PHOSPHORS OF DIFFERENT DENSITIES

[75] Inventors: Jacob Beutel, Hockessin; Sandra L. Issler; Daniel J. Mickewich, both of Wilmington, all of Del.

[73] Assignee: E. I. Du Pont de Nemours and Company, Wilmington, Del.

[21] Appl. No.: 69,564

[22] Filed: Jun. 1, 1993

[51] Int. Cl.$^5$ ............................................... G03C 1/46
[52] U.S. Cl. ............................... 250/483.1; 250/486.1
[58] Field of Search ........................... 250/483.1, 486.1

[56] References Cited

U.S. PATENT DOCUMENTS

| | | | |
|---|---|---|---|
| 4,710,637 | 12/1987 | Luckey et al. | 250/486.1 |
| 4,800,136 | 1/1989 | Arakawa et al. | 428/690 |
| 5,070,248 | 12/1991 | Pesce | 250/483.1 |
| 5,108,881 | 4/1992 | Dickerson et al. | 430/502 |
| 5,216,252 | 6/1993 | Boone et al. | 250/483.1 |

FOREIGN PATENT DOCUMENTS 0115125  8/1984  European Pat. Off. ......... 250/486.1

*Primary Examiner*—Paul M. Dzierzynski
*Assistant Examiner*—Richard Hanig

[57] ABSTRACT

A pair of intensifying screens for use in high resolution radiography comprises a front screen comprising a phosphor with a density of no more than 5.5 g/cm$^3$ and a back screen comprising a phosphor with a density of at least 6.0 g/cm$^3$.

9 Claims, 1 Drawing Sheet

RADIOLOGICAL SYSTEM EMPLOYING PHOSPHORS OF DIFFERENT DENSITIES

FIELD OF INVENTION

This invention relates to the field of radiology and, more specifically, to a film/screen radiological system with improved image quality.

BACKGROUND OF THE INVENTION

Medical imaging by film/screen systems is widely recognized as one of the most useful tools in medical diagnostics. Early X-ray images obtained with intensifying screens required considerable patient dose and provided relatively poor image quality. In modern practice, patient dose has decreased by several orders of magnitude and image quality, in terms of the visibility of potentially useful diagnostic information content, has increased significantly. Still, the continued demand for higher image quality and lower dose is evidenced by continuing efforts to improve both films and intensifying screens.

It is well known in the art that the penetrating power of X-rays is roughly proportional to the beam energy. The fraction of the X-ray energy absorbed by a material decreases as the energy of the X-ray beam increases. As the penetrating power of the X-ray beam is increased, the difference in X-ray absorption between different materials in the exposed subject matter decreases and thus the X-ray contrast decreases. High energy exposures, e.g., 120 kVp, can be utilized where larger differences in X-ray absorption are present in the subject matter. This typically occurs when materials of different densities are present in the subject. One example is thoracic radiology, where the ribs and the mediastinum have high X-ray absorption and the lungs have a low X-ray absorption. In instances where the subject matter does not have large differences in X-ray absorption, low energy X-rays are used to enhance X-ray contrast. Low energy X-rays are typically used for soft tissue radiographs, such as mammography.

To increase the speed of the film/screen system, radiographs are typically obtained with a system comprising two screens with a film between them. The film comprises photographic emulsions coated on both sides of a support and is typically referred to in the art as "double emulsion." A double emulsion system has been difficult to employ for low energy X-ray systems. The screen closest to the X-ray source absorbs a large portion of the X-radiation and there is not a sufficient amount of radiation reaching the furthest screen to generate an acceptable image.

Because low energy X-rays are strongly absorbed by the X-ray phosphors, soft tissue radiography, i.e. mammography, generally utilizes single screens in combination with films coated on one side of a support. Thus, the speed of the film/screen systems utilized in soft tissue radiographs is generally lower than that of systems used in general radiography, leading to higher patient dose for mammography exams.

There has been an ongoing effort in the art to reduce patient dose and circumvent the problem associated with two-screen mammography systems. Efforts to avoid strong X-ray absorption of a front screen have been described in U.S. Pat. No. 4,710,637. This patent teaches the use of a high density phosphor with a high cross-section of X-ray absorption and high X-ray-to-light conversion efficiency of the front screen. The thickness of the front screen, as well as the coating weight of the phosphor it contains, is held very low so that a sufficient fraction of the incident X-ray energy is available to the back screen. In this configuration, high image sharpness, as measured by the Modulation Transfer Function (MTF), is achieved. Furthermore, this patent teaches that a back screen with the same type phosphor as the front is preferred. Lower MTFs are permissible for the back screen, as are greater intensifying screen thickness or coating weights. This permits phosphors of somewhat lower X-ray absorption efficiency and/or X-ray-to-light conversion efficiency to be employed in the back screen.

As is known in the art, the coating weights of the two screens can be advantageously adjusted so that similar fractions of the incident X-ray energy are absorbed by each of the screens. For example, if the front screen coating weight is adjusted to absorb 40% of the energy of an incident 28 kVp X-ray beam produced by a molybdenum anode, then the back screen coating weight is adjusted to absorb 40/(100-40), or 67%, of the remaining incident X-ray energy.

The solution suggested by U.S. Pat. No. 4,710,637 has a significant disadvantage because the phosphor coating weight in the front screen must be extremely low. This low coating weight can only be accomplished with a very thin front screen phosphor coating. The thin coating leads to coating non-uniformities in thickness and in phosphor distribution in the screen and drying patterns which lead to a high degree of image mottle, generally called "structure noise." Furthermore, the reproducible manufacture of very thin front screens is very difficult to maintain. Therefore, because of coating non-uniformities in the thin front screen, and other reasons, mammography systems utilizing the thin front/thick back screen have been of minor consequence in practical applications.

SUMMARY OF THE INVENTION

The present invention comprises a front radiographic intensifying screen and a back radiographic intensifying screen capable of exposing a photographic element interposed therebetween; wherein said front intensifying screen comprises a phosphor with a density of no more than 5.5 g/cm$^3$ and said back intensifying screen comprises a phosphor with a density of at least 6.0 g/cm$^3$.

In a particularly preferred embodiment, the invention comprises a radiographic recording system comprising, in combination:

(a) a front intensifying screen comprising a phosphor layer coated on a support, wherein said phosphor is selected from the group of:
  (1) $BaSO_4$ activated with lead;
  (2) $Y_2O_3$ activated with gadolinium, cerium, bismuth, lead or combinations thereof;
  (3) $DP_2O_7$ wherein D is hafnium or zirconium;
  (4) GFCl activated with europium where G represents barium or partial substitution thereof by an alkali metal and/or a trivalent metal;
  (5) YOX activated with cerium, gadolinium, bismuth or lead where X is fluorine, chlorine, or bromine;
  (6) $Y_2O_2S$ activated with bismuth, cerium, gadolinium, lead or combinations thereof;
  (7) $BaSiO_3$ activated with lead;

(8) YPO$_4$ activated with gadolinium, indium or combinations thereof;
(9) Ca$_2$ZrSi$_4$O$_{12}$ activated with lead;
(10) BaZnSiO$_2$ activated with lead; and
(11) combinations thereof;
(b) a back intensifying screen comprising a phosphor layer coated on a support, wherein said phosphor is selected from the group of:
(1) YTaO$_4$, unactivated or activated with niobium, thulium, gadolinium, terbium or combinations thereof;
(2) LuTaO$_4$, unactivated or activated with niobium, thulium, gadolinium, terbium or combinations thereof;
(3) a solid solution of (1) and (2);
(4) GdTaO$_4$, activated with terbium;
(5) a solid solution of at least two of (1), (2) and (4);
(6) any of (1) to (5), wherein up to 45 mole percent of the yttrium, lutetium or gadolinium is replaced by lanthanum;
(7) any of (1) to (6), wherein up to 15 mole percent the yttrium, lutetium or gadolinium is replaced by ytterbium; and
(8) any of (1), (2) and (3), wherein up to 15 mole percent of the yttrium or lutetium is replace by gadolinium;
(9) Mg$_4$Ta$_{2-2x}$Nb$_{2x}$O$_9$: M$_y$Na$_{y'}$, wherein
M is at least one of K, Rb, or Cs;
x is $5 \times 10^{-4}$ to 0.5;
y is at least $2 \times 10^{-3}$, and
y+y' is less than 1.0;
(10) hafnium zirconlure germanate unactivated or activated with titanium;
(11) Hf$_{1-z}$Zr$_z$M$_y$Ti$_x$E$_e$O$_a$ wherein
E represents at least one of germanium and silicon;
e is in the range of from greater than $1 \times 10^{-3}$ to 0.1;
M represents at least one alkali metal;
x is in the range of from $3 \times 10^4$ to 1.0;
y is in the range of $1 \times 10^4$ to 1.0;
z is in the range of from $4 \times 10^4$ to 0.3; and
a is sufficient to balance the charge;
(12) CaWO$_4$;
(13) titanium activated hafnium zirconium oxide containing at least one alkali metal and up to two rare earth elements;
(14) Li$_2$Hf$_{1-x-y-z}$Zr$_z$Sn$_y$Ti$_x$L$_w$O$_3$ where
L is at least one rare earth element;
w+x+y collectively are 0 to 0.2; and
z is up to 0.2;
(15) LnOX activated with terbium, thulium, cerium, ytterbium, or bismuth, wherein Ln is gadolinium, lanthanum or combinations thereof and X is fluorine, chlorine, or bromine; and
(16) Ln$_2$O$_2$S activated with at least one rare earth element, wherein Ln is gadolinium, lanthanum, lutetium or combinations thereof; and
(17) combinations thereof; and
(c) a double emulsion film element.

DETAILED DESCRIPTION OF THE INVENTION

Figure 1:
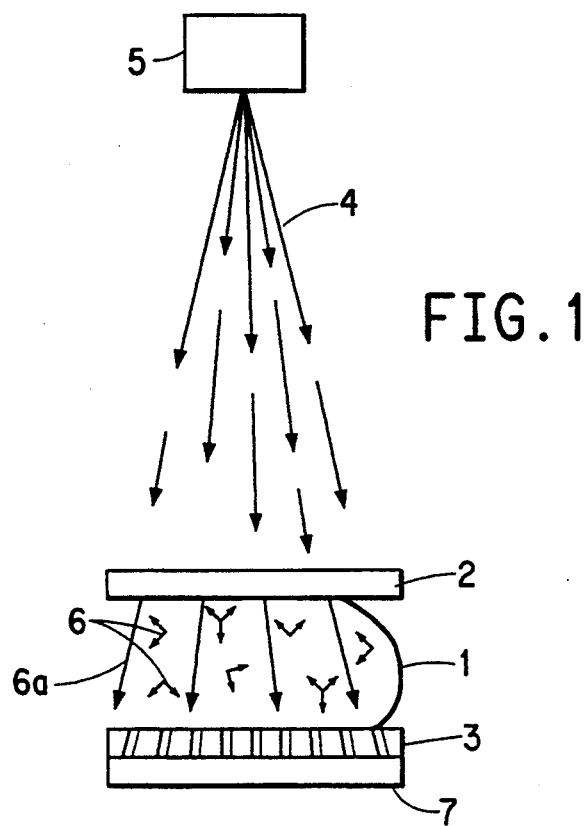
FIG. 1 is a schematic diagram of an apparatus for mammography imaging.

FIG. 1 shows a typical mammography imaging apparatus in schematic. The object to be examined 1 is located between a compression plate 2 and an exposure grid 3. X-radiation 4 emanates from an X-ray source 5 and passes through the substantially transparent compression plate 2 prior to irradiating the object.

As the X-radiation passes through the object, two phenomena occur. The first phenomenon is known as scatter which is represented by 6. Scattered radiation is substantially attenuated by the grid 3 while primary radiation (represented at 6a) passes through the grid largely unattenuated. The second phenomenon is that the radiation is selectively absorbed within the object, thereby forming an imagewise X-ray intensity modulation which corresponds to structural variations within the object.

X-radiation whose intensity (or fluence) has been imagewise modulated and which passes through the grid 3 is then recorded on the image recording device 7. This invention provides improvements in the ability to accurately convert the imagewise modulated x-radiation intensity into an image.

Figure 2:
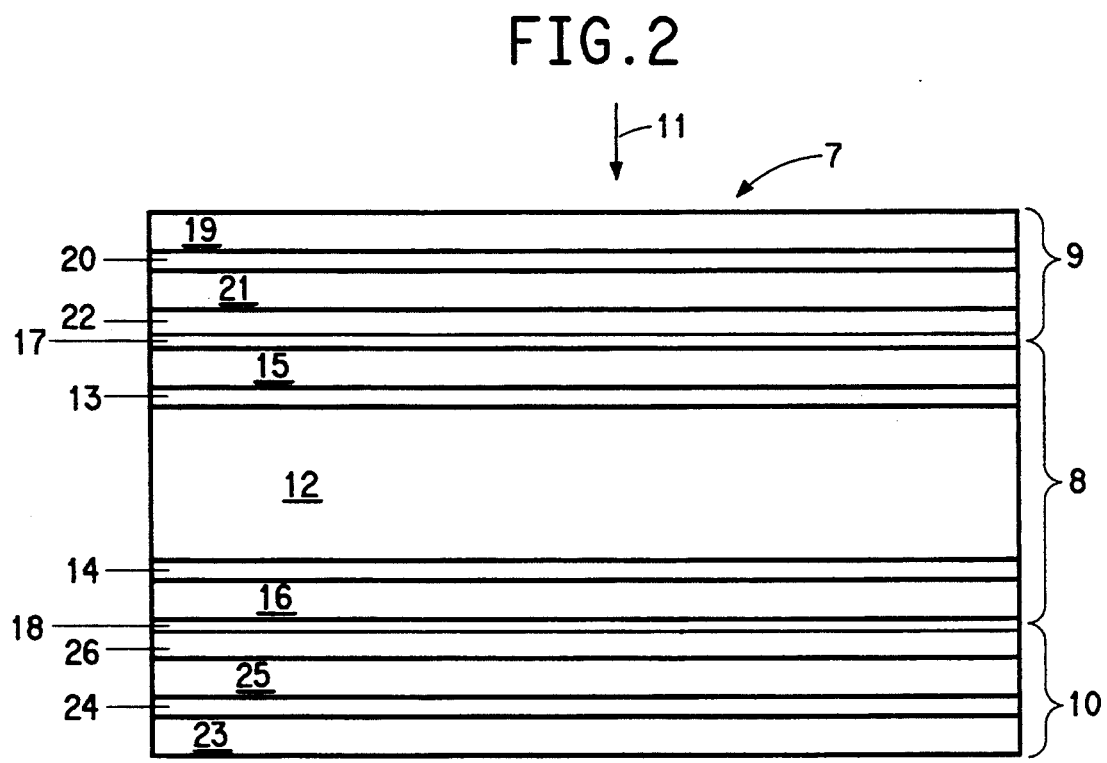
FIG. 2 is a cross-sectional view of a image recording element comprising a pair of X-ray intensifying screens in combination with a film element.

FIG. 2 shows a cross-sectional view of the image recording device 7, which comprises a film element 8 disposed between a front intensifying screen 9 and a back intensifying screen 10. It can be seen from FIG. 2 that the front screen 9 is located closest to the X-ray exposure source, represented by arrow 11. The film element comprises a support 12 with subbing layers 13 and 14 coated on opposite sides thereof. Photosensitive layers 15, 16 are coated on the subbing layers. Optional, yet preferred, are anti-abrasion layers coated on both surfaces of the photographic element as represented by 17 and 18.

The front intensifying screen 9 comprises a support 19 with an interlayer 20 coated thereon. Adjacent the interlayer 20 is a phosphor layer 21 comprising a phosphor and a binder. Optional, yet preferred, is a protective layer 22. The back intensifying screen 10 is analogous to the front intensifying screen and comprises a support 23, interlayer 24, phosphor layer 25 and an optional, yet preferred, protective layer 26. The front intensifying screen 9, back intensifying screen 10, and film element 8, are typically contained in a reusable cassette, as known in the art, which is fashioned such that the exposed film can be easily replaced with a fresh piece of film after each exposure.

As already noted, the film elements used in the present invention comprise double-side coated silver halide elements or "double emulsions." The front and back emulsions may be the same or different. It is most preferred to prepare an emulsion which is spectrally sensitized to the emission of the phosphor in the screen closest to the emulsion. The front and back emulsions may have different gradient responses and speed responses as known in the art. If the two emulsions are different, it is preferable to provide some indicia for proper orientation of the film within the image recording cassette as known in the art.

Film elements containing tabular grain silver halide emulsions are preferred for use in the present invention. Tabular grain silver halide films are well known in the prior art and present the user with some considerable advantages over films with conventional grains, e.g., polyhedral grains. The tabular films can usually be coated at a much lower coating weight without loss of covering power. They can be hardened with small amounts of conventional hardeners, presenting a significant advantage over films containing conventional grains. It is preferred that at least 50% of the grains are tabular grains with a grain thickness of less than 0.5 mm, preferably 0.21 to 0.30 mm, and an average aspect ratio of at least 2:1, more preferred is an aspect ratio between 4.0 and 5.5:1.

Tabular silver chloride emulsions are also well-known and are described by Maskasky, U.S. Pat. No. 4,400,463; and Wey U.S. Pat. No. 4,399,205. Some other references which describe the manufacture and use of tabular grain elements are Dickerson, U.S. Pat. No. 4,414,304, Wilgus, et.al., U.S. Pat. No. 4,434,226; Kofron, et.al., U.S. Pat. No. 4,439,520; and Tufano, et .al ., U.S. Pat. No. 4,804,621.

After preparing the emulsion, it is coated in any conventional manner on a photographic support such as a dimensionally stable polyethylene terephthalate film suitably coated with a resin sub-layer followed by a gel sub-layer supra thereto. These are well-known silver halide support elements which may also be coated with any of the conventional antistatic subbing layers. Auxiliary layers may also be employed to provide protection from scratches, curl and the like as known in the art and detailed in *Research Disclosure,* August 1979, Item 18431.

Additionally, the film support for the photographic element may contain a dye to impart a tint therein, e.g., a blue tint, in fact it is so preferred.

As detailed herein, the density of the front screen phosphor must be no more than 5.5 g/cm$^3$ and preferably no more than 5.0 g/cm$^3$. Such phosphors permit a coating thicknesses of 50–100 mm, preferably 50–80 mm, while allowing absorbing 30–60% of the incident X-ray energy. The coating weight of the phosphor in the front screen will depend on the density of the particular phosphor which is utilized, taking into account the thickness and X-ray absorption parameters stated above.

The density of the phosphor can be determined by any conventional method as known in the art, including the use of Fisher Sub-Sieve Sizer which is common.

Exemplary phosphors for use in the front screen include:

(1) $BaSO_4$ activated with lead;
(2) $Y_2O_3$ activated with gadolinium, cerium, bismuth, lead or combinations thereof;
(3) $DP_2O_7$ wherein D is hafnium or zirconium;
(4) GFCl activated with europium where G represents barium or partial substitution thereof by an alkali metal and/or a trivalent metal;
(5) YOX activated with cerium, gadolinium, bismuth or lead where X is fluorine, chlorine, or bromine;
(6) $Y_2O_2S$ activated with bismuth, cerium, gadolinium, lead or combinations thereof;
(7) $BaSiO_3$ activated with lead;
(8) $YPO_4$ activated with gadolinium, indium or combinations thereof;
(9) $Ca_2ZrSi_4O_{12}$ activated with lead;
(10) $BaZnSiO_2$ activated with lead; and
(11) combinations thereof.

Particularly preferred phosphors for use in the front screen are $BaSO_4$ activated with lead, $Y_2O_3$ activated with gadolinium and BaFCl activated with europium.

The phosphor chosen for the back screen must have a high X-radiation absorption. It has been determined that phosphors with a density of at least 6.0 g/cm$^3$ are sufficient. Unlike the front screen, the back screen coating weight must be high enough to absorb as much radiation as possible. As is known in the art, a phototimer is sometimes employed to control the amount of X-ray exposure of the patient during the imaging process. In such cases, only enough X-radiation should pass through both screens to activate the phototimer. Absent use of a phototimer, however, it is preferred that all X-radiation be absorbed.

Phosphors which may be used to advantage in the back screen include:

(1) $YTaO_4$, unactivated or activated with niobium, thulium, gadolinium, terbium or combinations thereof;
(2) $LuTaO_4$, unactivated or activated with niobium, thulium, gadolinium, terbium or combinations thereof;
(3) a solid solution of (1) and (2);
(4) $GdTaO_4$, activated with terbium;
(5) a solid solution of at least two of (1), (2) and (4);
(6) any of (1) to (5), wherein up to 45 mole percent of the yttrium, lutetium or gadolinium is replaced by lanthanum;
(7) any of (1) to (6), wherein up to 15 mole percent the yttrium, lutetium or gadolinium is replaced by ytterbium; and
(8) any of (1), (2) and (3), wherein up to 15 mole percent of the yttrium or lutetium is replace by gadolinium;
(9) $Mg_4Ta_{2-2x}Nb_{2x}O_9:M_yNa_{y'}$ wherein
   M is at least one of K, Rb, or Cs;
   x is $5 \times 10^{-4}$ to 0.5;
   y is at least $2 \times 10^{-3}$, and
   $y+y'$ is less than 1.0;
(10) hafnium zirconlure germanate unactivated or activated with titanium;
(11) $Hf_{1-z}Zr_zM_yTi_xE_eO_a$ wherein
   E represents at least one of germanium and silicon;
   e is in the range of from greater than $1 \times 10^{-3}$ to 0.1;
   M represents at least one alkali metal;
   x is in the range of from $3 \times 10^{-4}$ to 1.0;
   y is in the range of $1 \times 10^{-4}$ to 1.0;
   z is in the range of from $4 \times 10^{-4}$ to 0.3; and
   a is sufficient to balance the charge;
(12) $CaWO_4$;
(13) titanium activated hafnium zirconium oxide containing at least one alkali metal and up to two rare earth elements;
(14) $Li_2Hf_{1-x-y-z}Zr_zSn_yTi_xL_wO_3$ where
   L is at least one rare earth element;
   $w+x+y$ collectively are 0 to 0.2; and
   z is up to 0.2;
(15) LnOX activated with terbium, thulium, cerium, ytterbium, or bismuth, wherein Ln is gadolinium, lanthanum or combinations thereof and X is fluorine, chlorine, or bromine; and
(16) $Ln_2O_2S$ activated with at least one rare earth element, wherein Ln is gadolinium, lanthanum, lutetium or combinations thereof; and
(17) combinations thereof.

Particularly preferred phosphors for use in the back screen are $YTaO_4$ unactivated or activated with gadolinium, niobium, or terbium and $LuTaO_4$ unactivated or activated with gadolinium, niobium, or terbium.

Calcium tungstate phosphors are taught by Wynd, et. al., U.S. Pat. No. 2,303,942. Niobium-activated and rare earth-activated yttrium, lutetium, and gadolinium tantalates are taught by Brixner, U.S. Pat. No. 4,225,653. Rare earth-activated gadolinium and yttrium middle chalcogen phosphors are taught by Royce, et.al., U.S. Pat. No. 3,418,246. Rare earth-activated lanthanum and lutetium middle chalcogen phosphors are illustrated by Yocum, U.S. Pat . No. 3,418,247. Terbium-activated lanthanum, gadolinium and lutetium oxysulfide phosphors are illustrated by Buchanan, et.al. U.S. Pat. No. 3,725,704. Cerium-activated lanthanum oxychloride phosphors are taught by Swindells U.S. Pat. No. 2,729,604. Terbium-activated and optionally cerium-activated lanthanum and gadolinium oxyhalide phosphors are disclosed by Rabatin U.S. Pat. No. 3,617,743 and Ferri, et. al., U.S. Pat. No. 3,974,389. Rare earth-activated rare earth oxyhalide phosphors are taught by Rabatin U.S. Pat. Nos. 3,591,516 and 3,607,770. Terbium-activated and ytterbium-activated rare earth oxyhalide phosphors are taught by Rabatin, U.S. Pat. No. 3,666,676. Thulium-activated lanthanum oxychloride or oxybromide phosphors are taught by Rabatin U.S. Pat. No. 3,795,814. A (Y, Gd) 202S:Tb phosphor wherein the ratio of yttrium to gadolinium is between 93:7 and 97:3 is taught by Yale, U.S. Pat . No. 4,405,691. Non-rare earth coactivators, such bismuth and ytterbium-activated lanthanum oxychloride phosphors are taught by Luckey, et.al., U.S. Pat. No. 4,311,487. Titanium activated zirconium and hafnium oxide phosphors are taught by Bryan, et.al., U.S. Pat. No. 5,095,218. Europium activated barium flourohalide phosphor wherein a portion of barium is replaced with an alkali metal and a trivalent metal are taught in Umemoto, et. al., U.S. Pat. No. 5,089,170. Titanium activated and unactivated hafnium zirconium germanate phosphors are taught in Lambert, et. al., U.S. Pat. No. 5,112,700. Magnesium tantalum niobium oxide phosphors are taught in Sieber, et. al., U.S. Pat. No. 5,132,192. Hafnium zirconlure phosphors are taught by Bryan, et. al., U.S. Pat. Nos. 4,996,003; 4,988,880 and 4,988,881. The mixing of phosphors as well as the coating of phosphors in separate layers of the same screen are recognized. Specific examples include mixtures of calcium tungstate and yttrium tantalate as illustrated by Patten, U.S. Pat. No. 4,387,141. In general, mixed phoshors should be chosen such that the density of the mixture obtained is within the limits set forth herein.

Conventionally, an intensifying screen comprises a support, an intensifying phosphor layer, and a topcoat or protective layer thereon. A reflective layer, such as a whitener (e.g. $TiO_2$ dispersed in a suitable binder) may also be incorporated into the screen structure. Commonly, this reflective layer is interposed between the phosphor layer and the support, or, alternatively, the whitener may be dispersed directly into the support. The reflective layer generally increases the light output of the intensifying screen during use. Because most of the reflective layers do not reflect UV radiation, their use with an ultraviolet-emitting phosphor offers no particular advantage. They may, nevertheless, be used if commercial availability dictates.

A non-reflective base is preferred for mammography applications. Particularly preferred for mammography is polyethylene terphthalate impregnated with a black pigment such as carbon black. The protective layer is important to protect the phosphor layer against mechanical damage. The protective layer should generally also be transparent to the light emitted from the phosphor.

The phosphor is preferably dispersed in a suitable binder prior to coating on a support. Binders are chosen such that they doe not deleteriously absorb the wavelength of radiation emitted by the phosphor. The binders are generally those which are conventionally employed in the art and are chosen from a wide variety of known organic polymers that are essentially transparent to x-radiation and emitted light. Commonly employed binders are sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane)elastomers. These and other useful binders are disclosed in U.S. Pat. Nos. 2,502,529; 2,887,379; 3,617,285; 3,330,310, 3,300,311; and 3,743,833; and in *Research Disclosure*, Vol. 154, February 1977, Item 15444, and Vol. 182, June 1979.

Particularly preferred binders are poly(urethanes), such as those commercially available under the trademark Estane from Goodrich Chemical Co., the trademark Permuthane from the Permuthane Division of Beatrice Foods Co., and the trademark Cargill from Cargill, Inc. The Carboset ® Acrylic resins manufactured by B.F. Goodrich, Cleveland, Ohio, e.g., Carboset ® 525, average molecular weight 260,000, Acid No. 76–85; Carboset ® 526, average molecular weight 200,000, Acid No. 100; Carboset ® XL-27, average molecular weight 30,000, Acid no. 8, etc. may also be mentioned.

Any conventional ratio of phosphor to binder can be employed. Generally thinner phosphor layers and sharper images are realized when a high weight ratio of phosphor to binder is employed. Preferred phosphor-to-binder ratios are in the range of from about 10:1 to 25:1 for screens which are repeatedly exposed without loss of structural integrity. Dyes may be added to the phosphor layer to shape the screen emission, control the screen speed and increase the MTF, if desired.

While not limited thereto, the present invention is particularly well suited for use with low energy X-ray exposure, such as mammography. As used herein, low energy X-ray exposure is defined as X-radiation wherein more than 50 percent of the photons have an energy of 40 KeV or less. Molybdenum target X-ray tubes can be used to produce quanta of energy levels below 28 KeV when operated at approximately 28 kVp and tungsten target X-ray tubes can be used effectively when operated at 24 kVp.

After exposure, the film is developed in any conventional manner. An exposed medical X-ray film typically developed to convert latent image centers within the silver halide grain into elemental silver. Unreacted silver halide is then removed by dissolving in a suitable fixer and the film is washed and dryed to provide a suitable image. Medical X-ray film processing is well documented in the art as exemplified in Wuelfing, U.S. Pat. No. 4,741,991.

EXAMPLES

The Screen Element

A pair of medical X-ray screens were prepared and coated as known in the art and detailed in Brixner U.S. Pat. No. 4,225,653; Zegarski, U.S. Pat. No. 5,141,673 and references therein. The front screen comprised yttrium oxide phosphor activated with 2 mol % gadolinium and the back screen comprised unactivated yttrium tantalate phosphor. The support was a conventional non-reflective (black) polyethylene polyterephthalate support. Neozapin yellow was added to the back screen to optimize relative speed and to improved MTF. Inventive screen 1 comprised 30 ppm neozapin yellow and Inventive screen 2 comprised 40 ppm neozapin yellow.

The control screen pair was purchased from Eastman Kodak, Rochester NY, under the name Kodak Min-R Fast and comprised gadolinium oxysulfide phosphor. The control screen pair comprised a thick back screen and a thin front screen in a manner consistent with the teachings of Luckey, U.S. Pat. No. 4,710,637.

The Film Element

A conventional, tabular grain, blue sensitive X-ray emulsion was prepared as well-known to one of normal skill in the art. This emulsion had tabular silver bromide grains. After precipitation of the grains, the average aspect ratio was determined to be about 5:1 and the thickness about 0.2 μm. The procedures for making tabular grains of this nature are fully described in Nottorf, U.S. Pat. No. 4,772,886 and Ellis, U.S. Pat. No. 4,801,522.

These grains were dispersed in photographic grade gelatin (about 117 grams gelatin/mole of silverbromide) and a suspension of 200 mg of 5-(3-methyl-2-benzothiazolinylidene)-3-carboxy-methylrhodanine sensitizing dye dissolved in 25 ml of methanol added to achieve 133 mg of dye per mole of silver halide, as described in Fabricius, et. al. U.S. Pat. No. 5,108,887 and Apple, et. al., U.S. Pat. No. 5,169,748.

At this point, the emulsion was brought to its optimum sensitivity with gold and sulfur salts as is well-known to those skilled in the art. The emulsion was then stabilized by the addition of 4-hydroxy-6-methyl-1,3,3a,7-tetraazaindene and 1-phenyl-5-mercaptotetrazole. The usual wetting agents, antifoggants, coating aides and hardeners were added.

The emulsion was then coated on both sides of a dimensionally stable, 7-mil thick polyethylene terephthalate film support which contained conventional resin and gelatin subbing layers on each side thereof. The emulsion was coated at a total coating weight of about 4.4 g. Ag/m². A thin abrasion layer of hardened gelatin was applied over the emulsion layers. After drying, samples of this film were used with each of the inventive X-ray intensifying screens made as described above.

The film used with the control screen was Kodak Min-RT which is a dual coated tabular grain film available from Eastman Kodak, Rochester N.Y.

Film/Screen Exposure Results

One of each of the aforementioned screen combinations were used to expose samples of X-ray film elements described above. An exposure was made at 28 kVp with an X-ray source using a molybdenum anode. After exposure, the films were developed in a standard X-ray developer formulation, fixed, washed and dried. The results are shown below.

| | Phosphor Coating | | Relative Speed | MTF[3] | Relative MTF |
|---|---|---|---|---|---|
| | Weight[1] Front | (Thickness)[2] Back | | | |
| Control | 9.3 | 31.0 | 100 | 0.413 | 1.00 |
| Inv. 1 | 15.5 (65) | 26.4 (85) | 136 | 0.445 | 1.08 |
| Inv. 2 | 15.5 (65) | 38.4 (105) | 128 | 0.421 | 1.02 |

Notes:
[1]Phosphor coating weight is expressed in mg/cm3
[2]Coating thickness expressed in microns
[3]MTF (Modulation Transfer Function) is reported at 4 line pairs/mm

What is claimed is:

1. A pair of radiographic intensifying screens comprising a front radiographic intensifying screen and a back radiographic intensifying screen capable of simultaneously exposing a photographic element interposed therebetween; wherein said front intensifying screen comprises a phosphor with a density of no more than 5.5 g/cm³ and said back intensifying screen comprises a phosphor with a density of at least 6.0 g/cm³.

2. The intensifying screens of claim 1, wherein said front intensifying screen comprises a phosphor with a density of no more than 5.0 g/cm³.

3. The intensifying screens of claim 1 wherein said front intensifying screen comprises a phosphor selected from the group consisting of:
   (1) BaSO₄ activated with lead;
   (2) Y₂O₃ activated with gadolinium, cerium, bismuth, lead or combinations of the elements chosen from gadolinium, cerium, bismuth and lead;
   (3) DP₂O₇ wherein D is hafnium or zirconium;
   (4) GFCl activated with curopium where G represents barium or partial substitution thereof by an alkali metal, trivalent metal; or combination thereof;
   (5) YOX activated with cerium, gadolinium, bismuth or lead where X is fluorine, chlorine, or bromine;
   (6) Y₂O₂S activated with bismuth, cerium, gadolinium, lead or combinations of the elements chosen from bismuth, cerium, gadolinium and lead;
   (7) BaSiO₃ activated with lead;
   (8) YPO₄ activated with gadolinium, indium or combinations of gadolinium and indium;
   (9) Ca₂ZrSi₄O₁₂ activated with lead;
   (10) BaZnSiO₂ activated with lead; and
   (11) combination of phosphors chosen from (1)–(10).

4. The intensifying screens of claim 1 wherein said back intensifying screen comprises a phosphor selected from the group consisting of:
   (a) YTaO₄, unactivated or activated with niobium, thulium, gadolinium, terbium or combinations the elements chosen from niobium, thulium, gadolinium and terbium;
   (b) LuTaO₄, unactivated or activated with niobium, thulium, gadolinium, terbium or combinations of the elements chosen from niobium, thulium, gadolinium and terbium;
   (c) a solid solution of (a) and (b);
   (d) GdTaO₄, activated with terbium;
   (e) a solid solution of at least two of (a), (b) and (d);
   (f) any of (a) to (e) wherein up to 45 mole percent of the yttrium, lutetium or gadolinium is replaced by lanthanum;
   (g) any of (a) to (f) wherein up to 15 mole percent the yttrium, lutetium or gadolinium is replaced by ytterbium;

(h) any of (a), (b) and (c) wherein up to 15 mole percent of the yttrium or lutetium is replace by gadolinium;

(i) $Mg_4Ta_{2-2x}Nb_{2x}O_9:M_yNa_{y'}$ wherein
  M is at least one of potassium, rubidium, cesium;
  x is $5 \times 10^{-4}$ to 0.5;
  y is at least $2 \times 10^{-3}$, and
  $y+y'$ is less than 1.0;

(j) hafnium zirconium germanate unactivated or activated with titanium;

(k) $Hf_{1-z}Zr_zM_yTi_xE_eO_a$ wherein
  E represents at least one of germanium and silicon;
  e is in the range of from greater than $1 \times 10^{-3}$ to 0.1;
  M represents at least one alkali metal;
  x is in the range of from $3 \times 10^{-4}$ to 1.0;
  y is in the range of $1 \times 10^{-4}$ to 1.0;
  z is in the range of from $4 \times 10^{-4}$ to 0.3; and
  a is sufficient to balance the charge.

(l) $CaWO_4$;

(m) hafnium zirconium oxide containing at least one alkali metal and activated with titanium, at least one rare earth element or a combination of titanium and at least one rare earth element;

(n) $Li_2Hf_{1-x-y-z}Zr_zSn_yTi_xL_wO_3$
  where L is at least one rare earth;
  $w+x+y$ collectively are 0 to 0.2; and
  z is up to 0.2;

(o) LnOX activated with terbium, thulium, cerium, ytterbium, or bismuth wherein Ln is gadolinium or lanthanum and X is fluorine, chlorine, or bromine;

(p) $Ln_2O_2S$ activated with at least one rare earth element, where Ln is gadolinium, lanthanum or lutetium.

5. The intensifying screens of claim 3, wherein said front intensifying screen comprises a phosphor selected from the group consisting of $BaSO_4$ activated with lead; $Y_2O_3$ activated with gadolinium; and BaFCl activated with europium.

6. The intensifying screens of claim 4, wherein said back intensifying screen comprises a phosphor selected from the group consisting of unactivated $YTaO_4$; $YTaO_4$ activated with gadolinium; $YTaO_4$ activated with niobium; $YTaO_4$ activated with terbium; unactivated $LuTaO_4$; $LuTaO_4$ activated with gadolinium; $LuTaO_4$ activated with niobium; and $LuTaO_4$ activated with terbium.

7. A radiographic recording system comprising, in combination, a front intensifying screen, a back intensifying screen and a double emulsion film element in operative contact disposed therebetween; said front intensifying screen comprises a front phosphor layer coated on a support, wherein said front phosphor is selected from the group consisting of:

(1) $BaSO_4$ activated with lead;

(2) $Y_2O_3$ activated with gadolinium, cerium, bismuth, lead or combinations of the elements chosen from gadolinium, cerium, bismuth and lead;

(3) $DP_2O_7$ wherein D is hafnium or zirconium;

(4) GFCl activated with europium where G represents barium or partial substitution thereof by an alkali metal, trivalent metal; or combination thereof;

(5) YOX activated with cerium, gadolinium, bismuth or lead where X is fluorine, chlorine, or bromine;

(6) $Y_2O_2S$ activated with bismuth, cerium, gadolinium, lead or combinations of the elements chosen from bismuth, cerium, gadolinium and lead;

(7) $BaSiO_3$ activated with lead;

(8) $YPO_4$ activated with gadolinium, indium or combinations of gadolinium and indium;

(9) $Ca_2ZrSi_4O_{12}$ activated with lead;

(10) $BaZnSiO_2$ activated with lead; and

(11) combination of phosphors chosen from (1)–(10); said back intensifying screen comprises a back phosphor layer coated on a support, wherein said back phosphor is selected from the group consisting of:

(a) $YTaO_4$, unactivated or activated with niobium, thulium, gadolinium, terbium or combinations of the elements chosen from niobium, thulium, gadolinium, terbium;

(b) $LuTaO_4$, unactivated or activated with niobium, thulium, gadolinium, terbium or combinations of the elements chosen from niobium, thulium, gadolinium and terbium;

(c) a solid solution of (a) and (b);

(d) $GdTaO_4$, activated with terbium;

(e) a solid solution of at least two of (a), (b) and (d);

(f) any of (a) to (e) wherein up to 45 mole percent of the yttrium, lutetium or gadolinium is replaced by lanthanum;

(g) any of (a) to (f) wherein up to 15 mole percent the yttrium, lutetium or gadolinium is replaced by ytterbium; and (h) any of (a), (b) and (c) wherein up to 15 mole percent of the yttrium or lutetium is replace by gadolinium;

(i) $Mg_4Ta_{2-2x}Nb_{2x}O_9: MyNa_{y'}$ wherein
  M is at least one of potassium, rubidium, cesium;
  x is $5 \times 10^{-4}$ to 0.5;
  y is at least $2 \times 10^{-3}$, and
  $y+y'$ is less than 1.0;

(j) hafnium zirconium germanate unactivated or activated with titanium;

(k) $Hf_{1-z}Zr_zM_yTi_xE_eO_a$ wherein
  E represents at least one of germanium and silicon;
  e is in the range of from greater than $1 \times 10^{-3}$ to 0.1;
  M represents at least one alkali metal;
  x is in the range of from $3 \times 10^{-4}$ to 1.0;
  y is in the range of $1 \times 10^{-4}$ to 1.0;
  z is in the range of from $4 \times 10^{-4}$ to 0.3; and
  a is sufficient to balance the charge.

(l) $CaWO_4$;

(m) hafnium zirconium oxide containing at least one alkali metal and activated with titanium, at least one rare earth element or a combination of titanium and at least one rare earth element;

(n) $Li_2Hf_{1-x-y-z}Zr_zSn_yTi_xL_wO_3$
  where L is at least one rare earth;
  $w+x+y$ collectively are 0 to 0.2; and
  z is up to 0.2;

(o) LnOX activated with terbium, thulium, cerium, ytterbium, or bismuth wherein Ln is gadolinium or lanthanum and X is fluorine, chlorine, or bromine;

(p) $Ln_2O_2S$ activated with at least one rare earth element, where Ln is gadolinium, lanthanum or lutetium.

8. The radiographic element of claim 7, wherein said front intensifying screen comprises a phosphor selected from the group consisting of $BaSO_4$ activated with lead; $Y_2O_3$ activated with gadolinium; and BaFCl activated with europium and a phosphor selected from the group consisting of unactivated $YTaO_4$; unactivated $LuTaO_4$; $YTaO_4$ activated with gadolinium; and $LuTaO_4$ activated with gadolinium.

9. The radiographic element of claim 7 or 8, further comprising a double emulsion film element disposed between said front and back intensifying screens and in operative contact with each, and wherein said front screen absorbs between about 30 to about 60% of incident X-radiation when exposed to incident X-radiation.

* * * * *